United States Patent
Hede et al.

(10) Patent No.: US 10,992,680 B2
(45) Date of Patent: Apr. 27, 2021

(54) AUTHORIZATION CLIENT MANAGEMENT IN A DISTRIBUTED COMPUTING ENVIRONMENT

(71) Applicant: SAP SE, Walldorf (DE)

(72) Inventors: Bhagyesh Hede, Bangalore (IN); Milen Manov, Sofia (BG); Vasil Panushev, Sofia (BG)

(73) Assignee: SAP SE, Walldorf (DE)

( * ) Notice: Subject to any disclaimer, the term of this patent is extended or adjusted under 35 U.S.C. 154(b) by 224 days.

(21) Appl. No.: 16/023,804

(22) Filed: Jun. 29, 2018

(65) Prior Publication Data

US 2020/0007550 A1    Jan. 2, 2020

(51) Int. Cl.
*H04L 29/06* (2006.01)
*G06F 9/54* (2006.01)
*G06F 8/60* (2018.01)

(52) U.S. Cl.
CPC .............. *H04L 63/102* (2013.01); *G06F 8/60* (2013.01); *G06F 9/547* (2013.01); *H04L 63/0853* (2013.01)

(58) Field of Classification Search
CPC ..... H04L 41/0806; H04L 67/10; H04L 63/10; G06Q 10/06315
See application file for complete search history.

(56) References Cited

U.S. PATENT DOCUMENTS

| | | | |
|---|---|---|---|
| 8,613,055 B1 * | 12/2013 | Tomilson | G06F 21/335 726/4 |
| 9,386,007 B2 | 7/2016 | Minov et al. | |
| 9,774,586 B1 * | 9/2017 | Roche | G06F 21/6218 |
| 10,616,211 B2 * | 4/2020 | Jones | G06F 16/284 |
| 2004/0193909 A1 * | 9/2004 | Chang | G06F 21/6236 726/14 |
| 2006/0026667 A1 * | 2/2006 | Bhide | G06F 21/121 726/1 |
| 2007/0282841 A1 * | 12/2007 | Sreedhar | G06F 21/629 |
| 2008/0163335 A1 * | 7/2008 | Hagstrom | G06F 21/6218 726/1 |
| 2008/0168528 A1 * | 7/2008 | Lin | H04L 63/105 726/1 |
| 2010/0257043 A1 * | 10/2010 | Kassaei | G06Q 30/0601 705/14.23 |

(Continued)

OTHER PUBLICATIONS

U.S. Appl. No. 15/372,823, filed Dec. 8, 2016, Manov et al.

*Primary Examiner* — James R Turchen
(74) *Attorney, Agent, or Firm* — Fish & Richardson P.C.

(57) ABSTRACT

Techniques are described for management of authorization (e.g., OAuth) clients on a distributed computing environment (e.g., platform), through a deployment descriptor of the application(s) hosted in the environment. The deployment descriptor can be provided with the deployed application, and describes various permissions for access to services provided by the platform and scope(s) of such access. Credentials can be generated for each subscriber of the application, according to the scope(s) indicated in the descriptor, and an authorization client can be generated that describes the various subscriptions of the various access and access scope(s) associated with each subscription. The authorization client is available on the platform and accessed at application runtime to control the application's access to the various services available on the platform.

19 Claims, 4 Drawing Sheets

(56) References Cited

U.S. PATENT DOCUMENTS

| | | | |
|---|---|---|---|
| 2012/0066670 A1* | 3/2012 | McCarthy | G06F 8/61 717/169 |
| 2012/0151488 A1* | 6/2012 | Arcese | G06F 9/45504 718/101 |
| 2014/0074540 A1* | 3/2014 | Evans | H04L 67/10 705/7.25 |
| 2016/0087956 A1* | 3/2016 | Maheshwari | H04L 63/20 726/6 |
| 2017/0329957 A1* | 11/2017 | Vepa | G06F 21/34 |
| 2018/0101371 A1* | 4/2018 | Flanakin | G06F 8/34 |
| 2018/0150356 A1* | 5/2018 | Boshev | G06F 16/9566 |
| 2018/0157472 A1* | 6/2018 | Chen | H04L 41/0806 |
| 2019/0007421 A1* | 1/2019 | D | H04L 63/0807 |
| 2019/0065232 A1* | 2/2019 | Do | H04L 43/0817 |
| 2019/0065277 A1* | 2/2019 | Raikov | H04L 67/10 |
| 2019/0132932 A1* | 5/2019 | Klecha | H05B 45/60 |
| 2019/0253430 A1* | 8/2019 | Gamache | H04L 63/104 |
| 2020/0007531 A1* | 1/2020 | Koottayi | H04L 63/0815 |

* cited by examiner

AUTHORIZATION CLIENT MANAGEMENT IN A DISTRIBUTED COMPUTING ENVIRONMENT

BACKGROUND

A distributed computing environment, such as a cloud computing environment, can host various applications that execute on the environment. Subscribers to the distributed computing environment can request access to the application executing in the environment, instead of executing on the application locally on their own computing device. In some instances, the environment may provide various services that are usable by the application(s) that execute in the environment, such as database services among others.

SUMMARY

Implementations of the present disclosure are generally directed to authorization client management in a distributed computing environment. More specifically, implementations are directed to techniques for provisioning and/or updating authorization clients, such as Open Authorization (OAuth) clients, as part of a deployment process that deploys an application to a distributed computing environment.

In general, innovative aspects of the subject matter described in this specification can be embodied in methods that include operations of: receiving an indication of a deployment of an application to a distributed computing environment; parsing a deployment descriptor associated with the application to determine at least one permission indicated in the deployment descriptor, where each permission in the deployment descriptor indicates: i) a service that is provided on the distributed computing environment and that is to be accessible by the application, and ii) a scope of the access by the application to the respective service; identifying one or more subscriptions to the application on the platform; for each respective subscription of the one or more subscriptions, providing one or more credentials for the respective subscription that correspond to the at least one permission indicated in the deployment descriptor; and providing an authorization client that includes the at least one permission for each respective subscription of the one or more subscriptions.

Implementations can optionally include one or more of the following features: the application and the deployment descriptor are included in a deployment package through which the application is deployed to the distributed computing environment; the authorization client is arranged according to a version of the Open Authorization (OAuth) standard; the operations further include providing a destination that points to an authorization server that is a token end point to issue access tokens with populated credentials; the operations further include accessing the destination, during execution of the application, to obtain an access token from the authorization server with the populated credentials, the access token including at least one scope that is assigned to modify a configuration in a context of a subscription that is being used to access the application; the service that is provided on the distributed computing environment is an application programming interface (API); providing the one or more credentials for the respective subscription includes creating one or more credentials for the respective subscription, and assigning at least one scope to the one or more credentials that corresponds to the scope described in the at least one permission indicated in the deployment descriptor; and/or providing the one or more credentials for the respective subscription includes updating one or more existing credentials for the respective subscription to corresponding to the scope described in the at least one permission indicated in the deployment descriptor.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
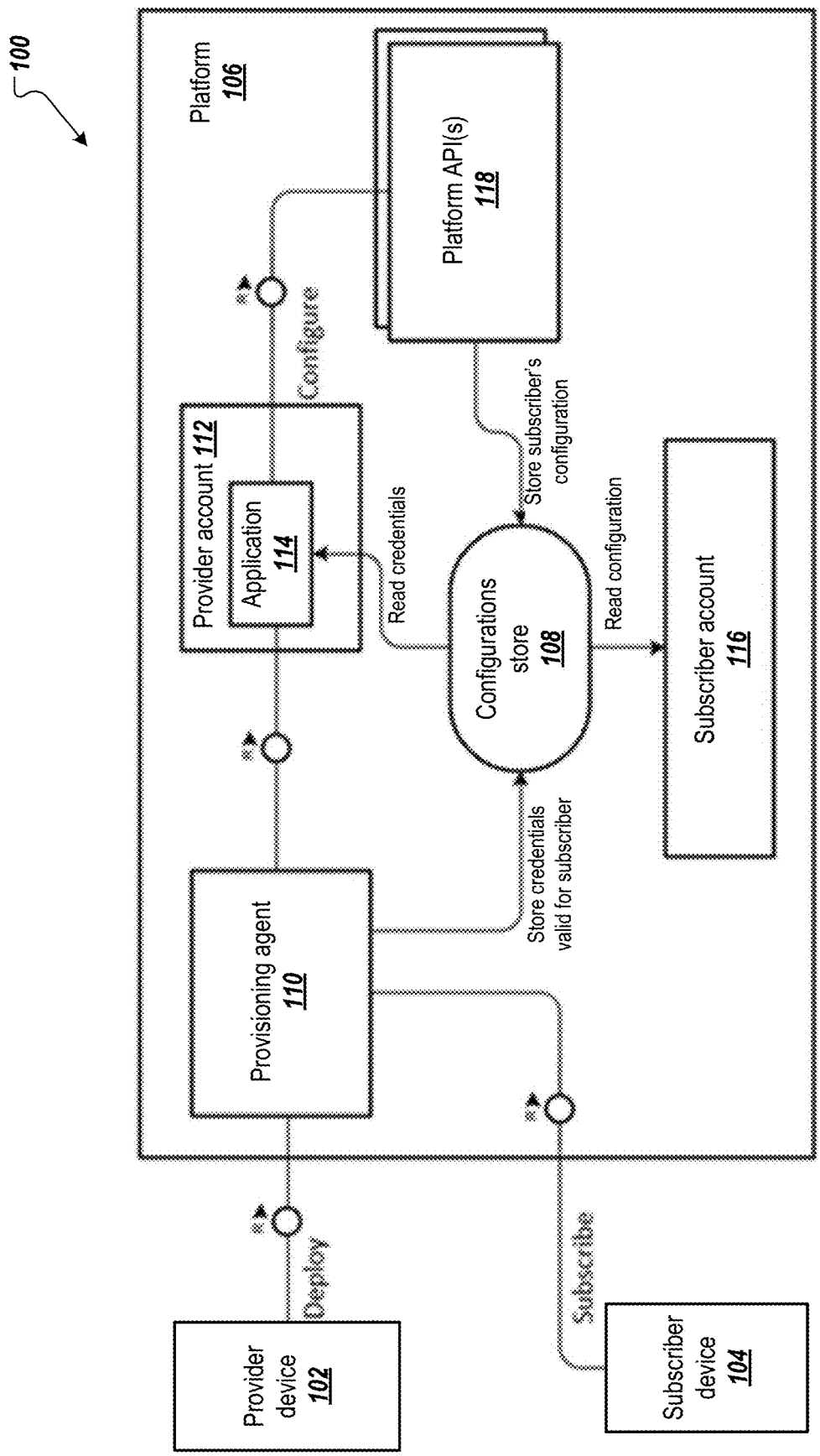
FIG. 1 depicts an example system for authorization client management, according to implementations of the present disclosure.

Implementations of the present disclosure are directed to systems, methods, computing devices, and/or computer-readable media for provisioning and/or updating authorization client(s) as part of an application deployment process within a distributed computing environment, and for using these authorization client(s) to perform configuration operations to enable the application(s) to operate within the distributed computing environment. In some implementations, the authorization client(s) support a version of the Open Authorization (OAuth) standard. Implementations also support other authorization standards. In some implementations, a set of OAuth-based application programming interfaces (APIs) are provided within a distributed computing environment. The distributed computing environment (e.g., a cloud computing environment) is also described herein as the platform, and can host any suitable number of applications that are offered as a service according to a software-as-a service (SaaS) model or other suitable paradigm.

Traditionally, maintaining authorization clients in a distributed computing environment has posed a challenge for organizations that manage the distributed computing environment, particularly when different authorization scopes are to be specified for different customers and/or different applications across a distributed computing environment. Requiring customers to maintain OAuth settings for every feature in multiple applications, potentially with varying scope for authorized access, has been a challenge, particularly when new features are to be added to application(s).

Implementations provide techniques for management of OAuth clients, and/or other suitable types of authorization clients, through a deployment configuration of the application(s), to be available to customer(s) as part of a software update for the application(s). This solution can provide a finer-grained and less costly technique to control how settings are specified, and to avoid errors and inconsistencies. An authorization client provides a credential that is used to enable users to access an application executing within the platform. The authorization client can include a unique string that represents registration information provided by the client. The client can also include scopes and/or authorities describing what application features (e.g., scope) and what applications (e.g., authority) the client is allowed to access. For example, a scope description can indicate what the client is permitted to do in an application, and/or the portions of application that the client is authorized to access, such as certain reports or other feature(s).

The distributed computing environment, also described as the platform, provides application hosting services for any suitable number of applications that are deployed to and executing on the platform. In some implementations, a deployment descriptor of an application describes which authorization clients to register and with what particular scope(s) to control access to the application. When an application is deployed, a component in the deployment logic (e.g., the provisioning agent described below) searches for the deployment descriptor for the application, which may be included in a deployment package that includes the application. On finding the descriptor, the logic can resolve all the subscribers (e.g., accounts) that are subscribed to the application. For each subscriber, the platform can register an authorization (e.g., OAuth) client, which is allowed to perform operations depending on the particular scope defined in the descriptor. Also, the platform can register the destination which includes the credentials of the client, where such destination is accessible by the deployed application at runtime. Accordingly, when a subscriber device makes a call in the context of the subscription, this destination can be accessed and credentials can be retrieved. In this way, an application is capable of using the registered client because the destination includes the credentials of the client, and can obtain access tokens and execute the appropriate operations to provision users, provision roles, and so forth.

On the platform an account can be associated with multiple possible end-users to consume the platform services. Accordingly, any suitable number of end-users can be using a subscription provided by a particular account. When access to platform services, such as a deployed application, is requested, the deployment descriptor is checked to confirm that requested access conforms with the scope associated with an accessing account.

At deployment time, the platform can issue an authorization (e.g., OAuth) client that is accessible to the deployed application. The application can access the authorization client and use it to issue particular tokens with the credentials of the client. For example, an application can be deployed with an OAuth client indicating the scope that the application is allowed to provision or otherwise manage users. If an end-user accesses the application and attempts to access a provision users feature, and application can automatically update an access token and provision the requested number of users into that account, according to the determination that the requested actions falls within the authorized scope for this account.

FIG. 1 depicts an example system 100 for authorization client management, according to implementations of the present disclosure. As shown in this example, the system 100 can include a provider device 102 (employed by a provider) and a subscriber device 104 (employed by a subscriber), which can be any suitable type of computing device. The system 100 also includes a platform 106 that provides the distributed computing environment for hosting applications 114. The platform 106 can include a provisioning agent 110, a provider account 112 associated with the provider device 102, a subscriber account 116 associated with the subscriber device 104, a configurations store 108 that stores any number of account configurations, and one or more platform APIs 118. The provider account 112 can be associated with any number applications 114, the provider having provided the application(s) 114 to be hosted and accessible on the platform 106.

The provider can use the provider device 102 to access the platform 106 and deploy an application 114 to the platform 106. The application 114 can be deployed in the provider account 112, as shown in the example of FIG. 1. In deploying the application 114, platform 106 uses a deployment descriptor that is provided with the application 114, such as in a deployment package with the application 114. The platform APIs 118 can include an authorization (e.g., OAuth) client provisioning API that operates to provision the authorization client for an application 114. The configuration store 108 can store a configuration for the application 114 that includes information (e.g., metadata) associated with the application 114, including credentials for accessing the application 114. The configuration can be used to configure a subscription to the application 114 for each subscriber. A subscriber account 116 can read the configuration and use the authorization client to perform appropriate operations. The provisioning agent 110 can detect and process the deployment descriptor which includes the information for the authorization client, and an API allows registration of clients based on the descriptor.

In some implementations, the provider specifies the information that is in the deployment descriptor, and can provide the deployment descriptor itself. The descriptor can be provided in any suitable format, including in a version of JavaScript Object Notation (JSON). In some examples, the descriptor is a part of the application 114, and can be provided in a same file as the application 114. When a subscriber attempts to access the application 114, their access can be controlled based on the information in the deployment descriptor.

Implementations provide various advantages over previously available solutions, by performing configuration operations on behalf of a user for resources that are shared between the user and the application 114. For example, the application 114 can request to consume platform-hosted resources on behalf of the user, offer guest service to the user, and so forth. The resources requested may be on the same platform as the provider application 114, where the subscriber account 116 is present. This information can be shared within the platform 106, so roles can be assigned to users as specified by the provider. This process can happen automatically without specific interaction of users, such that there is no need to notify a provider that they need to assign a user to a new role, or upload a new configuration in response to a new user attempting to access the application 114. The platform can do this automatically.

In some implementations, the platform 106 provides APIs, such as a user roles API and an access database API. These APIs and/or others can be accessed by the application. Accordingly, a provider may not need to be an account administrator to approve scopes on an individual basis. Implementations assume a trust relationship between the provider's application 114 and account, and based on that trust relationship the deployment descriptor can be employed to (e.g., incrementally) change the scope as appropriate, as the provider application 114 adopts new features. Moreover, implementations provide further advantages in that the OAuth activation can include the configuration for a particular scope on a particular page, for example, and build on the concept of provider of service and consumer of service in an account. Based on that, the platform 106 can automatically deliver a specific configuration for use in the operation of a particular service. Also, the platform 106 can host multiple accounts that have different scopes, as specified in deployment descriptor, and in some examples also can be version-specific per version of the application 114.

Implementations also enable the updating of accounts and inclusion of new scopes for a new account. When a new version of an application 114 is deployed, the deployment descriptor containing the requested authorization (e.g., OAuth) clients and scopes is checked and compared to the current state. If there is difference, then the new data is considered to be overriding and comes from the new deployment. The client can be updated and/or recreated with the new scopes. For example, a new deployment can come with two scopes to manage users and to manage groups, and the existing authorization client can be updated to include these new scopes. When an account is removed, the data and configurations linked to the account can be removed also, including the authorization client and scopes linked to the account.

In some instances, if a subscription is requested to an already provisioned application 114 without doing a redeployment, the subscription may be followed by a redeployment of the application to incorporate details of the new subscription. Creating a subscription means that an application 114 can be accessed in the context of the subscriber account 116, which includes configurations for authentication, and so forth. When the application 114 is accessed in the context of the subscription and/or the account, then the configurations of the account are used at runtime to check the authentication configuration and use it to authenticate the user, depending on the context of the account. A subscription allows users of an account to access an application 114 according to the configuration for the application 114 and the subscriber. From a security standpoint, a user subscribes to an application 114 and the application 114 is allowed to manage the user account in various ways on the platform. This may be based on whitelisting per application 114, such that a whitelist indicates who is allowed to employ this mechanism for trusted applications, and not necessarily for any user on the platform. In some implementations, a security constraint can be enforced to allow the execution of the scope (e.g., only) in subscriptions that are complying with information such as the whitelist.

FIG. 1 represents an example scenario where a provider offers a service via an application 114 deployed on the platform 106. Consumers interested in the service can register an account on the platform 106 and subscribe to the application 114 offering the service without the need to deploy a separate instance of the application 114.

Applications often take advantage of multiple capabilities of the platform such as connectivity to external systems, identity storage, authentication, authorization, and so forth. Many of these capabilities allow a consumer-defined configuration to allow different consumers to use a certain feature as it suits their own purposes. For example, if there is a search engine integration offering on the platform, then a user A might want to use search engine X while a user B might prefer search engine Y. Such configurations can be stored and managed separately by the platform for privacy and security reasons. For similar reasons, access to these configurations can be controlled by the consumer. Such configurations can also be more complicated than the given example. Application providers seek to improve the user experience by performing as many of the configurations on their own on behalf of the subscribed consumers, instead of requiring the consumers to perform the configurations themselves. The configurations are provided by using the APIs provided by the platform, and for this purpose credentials that are valid for the subscriber's account are employed.

At subscribe time, the provisioning agent can store credentials (e.g. an OAuth client) that allow the application to use the APIs offered by the platform and perform the appropriate configurations on behalf of the subscriber. For security reasons, the credentials granted to the application may be with the minimal scope necessary to perform the configuration operations. In some instances, applications and platforms evolve over time to provide new features and new APIs along with new configurations for these. When a new version of the application appears, it might also take advantage of new APIs provided by the platform. For current subscribers, the scope of the credentials is limited to the APIs that existed at the time of the subscription.

Implementations allow an application to extend the permissions they have received from subscribers as necessary, such as when a new version of the application is deployed on the platform. The application can provide a deployment descriptor as part of the deployment package. This descriptor can list all the APIs and the scopes that the current version of the application is to access, to perform the configurations on behalf of the subscriber. This can simplify the delivery of application upgrades by the service provider, given that it removes the need for explicit external configuration.

When the application is deployed, the deployment processor of the platform will parse the deployment descriptor and determine the subscribers of the application. For each subscriber, depending on the state, if there are no credentials available for this subscription, the platform can create them and assign the necessary scopes. If there are credentials available for this subscription, but they are with different scopes than those specified in the descriptor, the platform can update the scopes so that they match those listed in the descriptor. The credentials can then be made available for the application so that it can later perform the necessary configurations.

This solution provides various benefits and/or technical advantages compared to previously available solutions. With each version of the application, the provider can be sure that, once deployed, the platform can automatically perform all the configurations specific for this version. Because the descriptor is packaged with the deployment archive, the lifecycle of the descriptor can be the same as the lifecycle of the code. For example, the descriptor can be stored in the same source control as the rest of the code and each version of the descriptor can correspond to the appropriate version of the code. In some implementations, the configuration of the application scopes are available for review by the customer, thereby making visible the current permissions required by the application on behalf of the subscriber.

In some implementations, the authorization is provided by a version of OAuth, such as OAuth version 2.0, with the client credentials grant. OAuth 2.0 (at least) is intended for constrained delegation which makes it particularly suitable for use in the implementations described herein. The subscriber can delegate at least some of their permissions on the platform to the application, so that the platform can perform the necessary configurations. The subscribers' configurations represent the platform and the platform APIs provide access to it once an access token with the appropriate scopes is provided.

A connectivity destination is a configuration that stores all the attributes to make a successful (e.g., HTTP) call to a target service. This configuration can information such as a URL, credentials, a trust store for secure (e.g., SSL) calls, a key store for client certificate authentication, and so forth.

A subscription configuration is a configuration that is created in the context of the subscription to an application. This configuration is controlled by the subscriber, and can be accessed by the application. An example of such is the SAML 2.0 trust configuration. It can be different for every subscriber, given that every subscriber can use their own user base and the application can have access to it so that it can process SAML messages for users.

The deployment descriptor can be a JSON file that describes the APIs and scopes needed by this version of the application. A sample descriptor is provided in Example Code 1, below.

Example Code 1

```
[
  {
    "destinationName": "Subscription configurator",
    "permissions": [
      {"api": "authorization", "scopes": ["read", "write"]},
      {"api": "trust", "scopes": ["read", "write"]}
    ]
  }
]
```

Example Code 2 provides example pseudo-code that describes the behavior of the deployment processor when such a descriptor is present in the deployment package.

Example Code 2

```
for (Subscription subscription in application.subscriptions) {
    if (!isPresent(subscription.oauthClient))
        subscription.oauthClient = new OAuthClient( )
    }
    oauthClient.clearScopes( )
    for (Permission permission in descriptor.permissions) {
        for (Scope scope in permission.scopes) {
            oauthClient.addScope(scope)
        }
    }
    if (!isPresent(subscription.destination)) {
        subscription.destination = new Destination( )
        subscription.destination.setName(descriptor.getDestinationName( ))
        subscription.destination.setURL("<oauth token end point>")
        subscription.destination.setUsername(subscription.oauthClient.getClientId( ))
        subscription.destination.setPassword(subscription.oauthClient.getSecret( ))
    }
}
```

Through execution of the logic such as that described in the example pseudo-code, the following entities can be created: an OAuth client with assigned scopes as written in the descriptor, and/or a destination pointing to the OAuth server token end point with the client's credentials populated. When the application is executed, the application can use the provisioned destination to obtain an access token from the OAuth server. This access token has scopes assigned to modify the configurations in the subscription's context.

Figure 2:
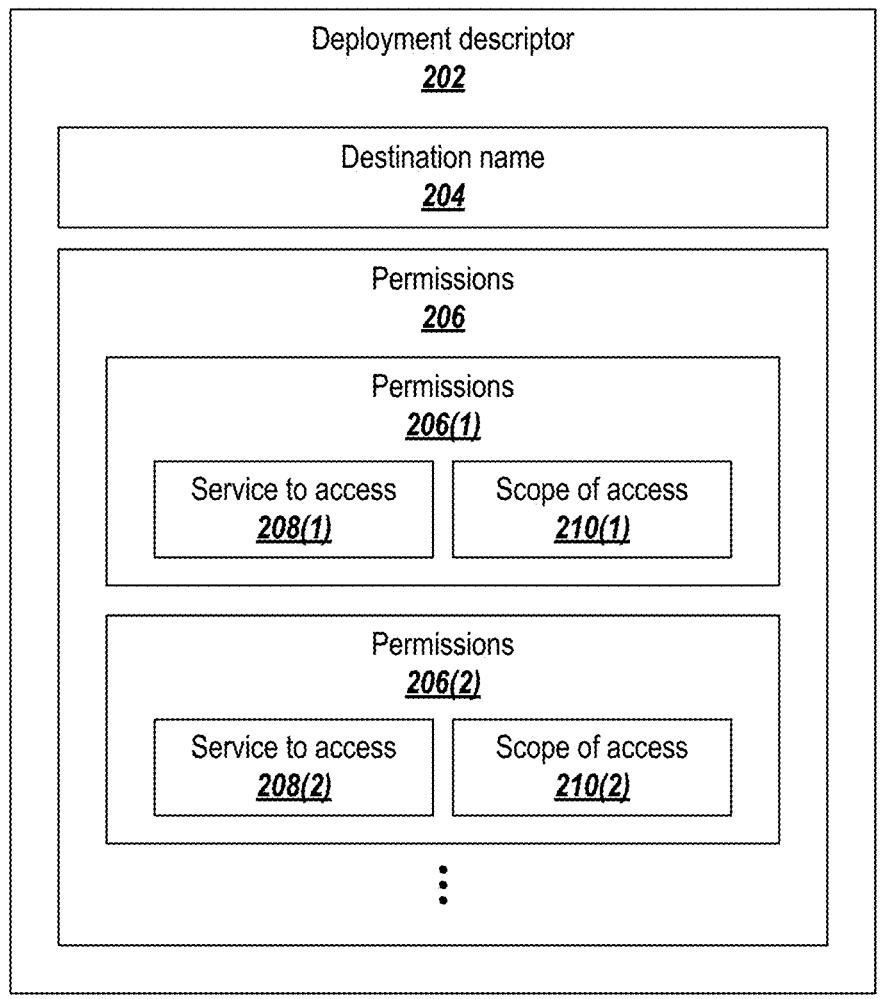
FIG. 2 depicts an example schematic for a deployment descriptor, according to implementations of the present disclosure.

FIG. 2 depicts an example schematic for a deployment descriptor 202, according to implementations of the present disclosure. As shown in this example, the descriptor 202 can include a destination name 204 indicating the particular application associated with the descriptor 202. The descriptor 202 can also include any number of permissions 206, which each include a description 208 of the service to be accessible by the application and a description 210 of the scope of such access. For example, the service to access 208 may identify a particular platform API that can be used by the application, such as the authorization API, trust API, and so forth. The scope of access 210 can indicate the type(s) of access that the application is to have to the corresponding service, such as read-only access, read and write access, and so forth. The illustrated schematic represents an example of one implementation, and is not meant to limit alternatives including more, less, or alternative information. In some implementations, the deployment descriptor 202 can include a modification prevention flag which, when set, can indicate that the destination is read-only and that the scope(s) cannot be changed by customers.

Figure 3:
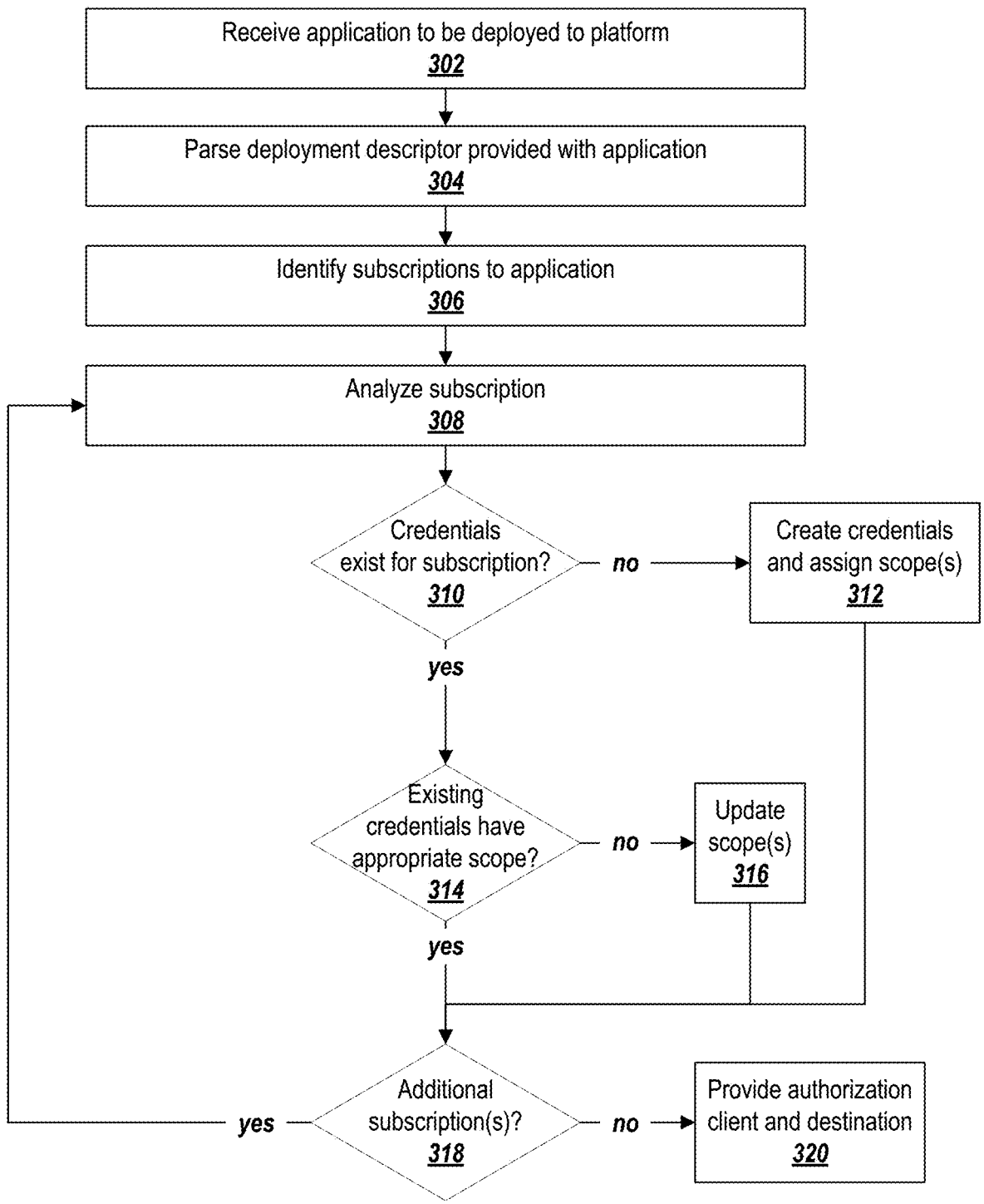
FIG. 3 depicts a flow diagram of an example process for authorization client management, according to implementations of the present disclosure.

FIG. 3 depicts a flow diagram of an example process for authorization client management, according to implementations of the present disclosure. Operations of the process can be performed by the provisioning agent 110, and/or other software module(s) executing on the platform 106 or elsewhere.

An application is received (302) to be deployed to the platform. The deployment descriptor for the application is parsed (304) or otherwise analyzed to determine the various access permissions specified in the descriptor. The subscription(s) to the application are also identified (306).

Implementations support various techniques through which subscribers to an application can be determined. In some implementations, an administrator of the subscriber account operating the account can review the list of services offered in the platform and execute a self service to subscribe to a specific service. This service can be offered by the application in the provider account. The act of subscription to the service can cause a subscription added to the provider application from the subscriber account. A subscription can be changed when the administrator decides to unsubscribe to the service. In some implementations, a subscription can be added by placing an order for the service in the sales system. This can cause the subscriber account to be created and automatically assigned a subscription to the provider application.

Each subscription is analyzed (308). If credentials do not currently exist for the subscription (310), credentials are created (312) for the subscription, with scope(s) as indicated in the descriptor. The process then continues to 318. If credentials currently exist for this subscription (310), the existing credentials are checked (314) to determine whether they have the appropriate scope as indicated in the descriptor. If not, the scope(s) of the credentials are updated to bring them into line with the descriptor (316), and the process continues to 318. If the current credentials already have the appropriate scope (314), the process continues to 318.

A determination is made (318) whether additional subscription(s) exist to the application, to be analyzed. If so, the process can return to 308 and analyze another subscription. If no, additional subscriptions remain to be analyzed for this application (318), the authorization (e.g., OAuth) client is provided (320), with the assigned scopes for the subscriptions as described in the descriptor. The process can also create the destination that points to the OAuth server token end point, with the client's credentials populated.

Figure 4:
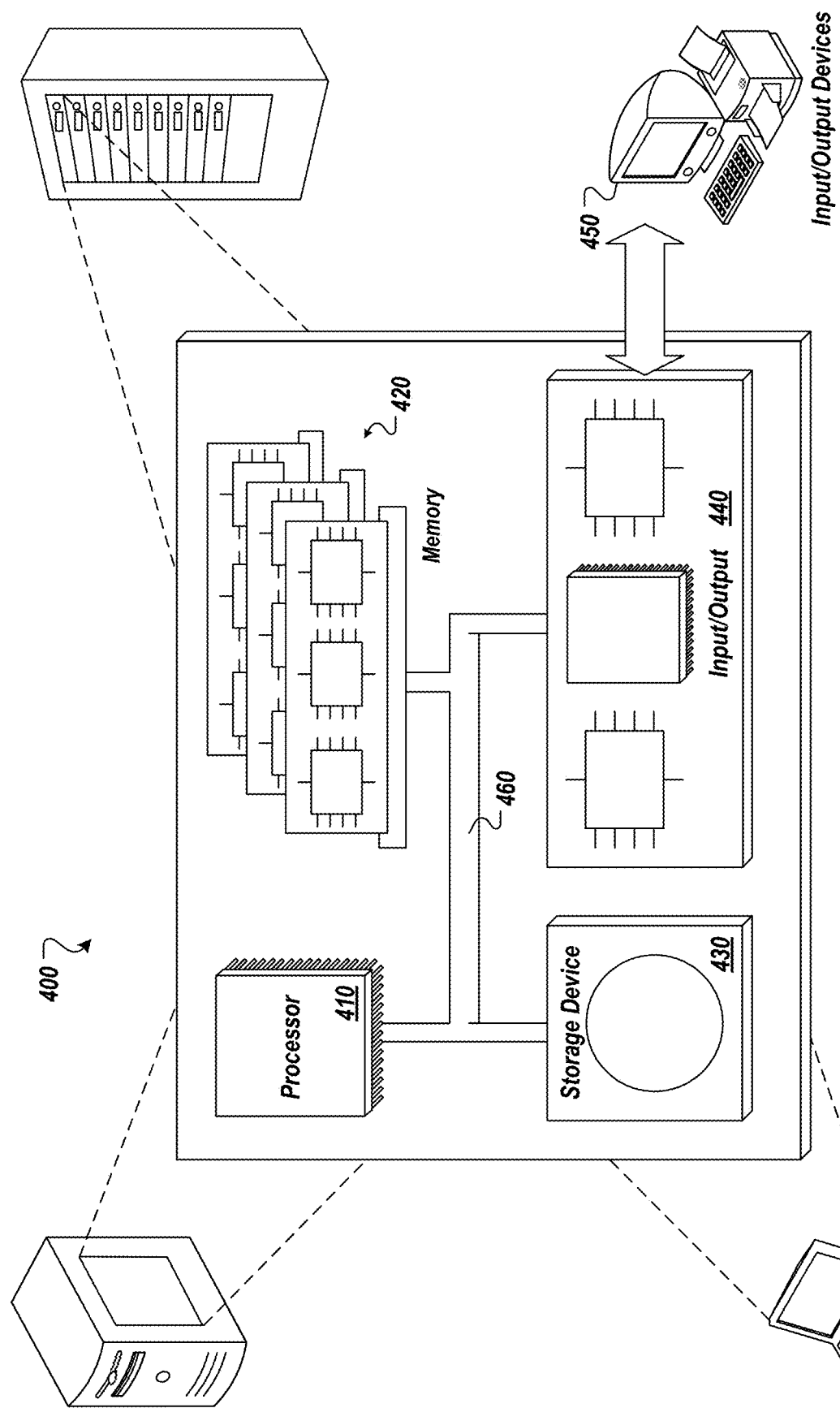
FIG. 4 depicts an example computing system, according to implementations of the present disclosure.

FIG. 4 depicts an example computing system, according to implementations of the present disclosure. The system 400 may be used for any of the operations described with respect to the various implementations discussed herein. For example, the system 400 may be included, at least in part, in one or more of the provider device 102, the subscriber device 104, the platform 106, and/or other computing device(s) or system(s) described herein. The system 400 may include one or more processors 410, a memory 420, one or more storage devices 430, and one or more input/output (I/O) devices 450 controllable through one or more I/O interfaces 440. The various components 410, 420, 430, 440, or 450 may be interconnected through at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks using any network protocol.

Computing devices of the system 400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one processor, the method comprising:
receiving, by the at least one processor, an indication of a deployment of an application to a distributed computing environment;
parsing, by the at least one processor, a deployment descriptor associated with the application to determine at least one permission indicated in the deployment descriptor, wherein each permission in the deployment descriptor indicates: i) a service that is provided on the distributed computing environment and that is to be accessible by the application, and ii) a scope of access by the application to the respective service;
identifying, by the at least one processor, one or more subscriptions to the application on a platform;
for each respective subscription of the one or more subscriptions, providing, by the at least one processor, one or more credentials for the respective subscription that correspond to the at least one permission indicated in the deployment descriptor;
providing, by the at least one processor, an authorization client for each respective subscription of the one or more subscriptions, wherein the authorization client stores the at least one permission;
storing, by the at least one processor, a first credential of the one or more credentials in a destination, wherein the first credential is associated with a first subscription of the one or more subscriptions;
accessing, by the at least one processor, the destination to obtain an access token based on the first credential, the access token including at least one scope that is assigned to modify a first configuration in a context of the first subscription that is being used to access the application; and
modifying, by the at least one processor, the first configuration based on the at least one scope included in the access token.

2. The method of claim 1, wherein the application and the deployment descriptor are included in a deployment package through which the application is deployed to the distributed computing environment.

3. The method of claim 1, wherein the authorization client is arranged according to a version of the Open Authorization (OAuth) standard.

4. The method of claim 1, further comprising:
providing, by the at least one processor, the destination that points to an authorization server that is a token end point to issue access tokens with populated credentials.

5. The method of claim 1, wherein the service that is provided on the distributed computing environment is an application programming interface (API).

6. The method of claim 1, wherein providing the one or more credentials for the respective subscription includes creating one or more credentials for the respective subscription, and assigning at least one scope to the one or more credentials that corresponds to the scope described in the at least one permission indicated in the deployment descriptor.

7. The method of claim 1, wherein providing the one or more credentials for the respective subscription includes updating one or more existing credentials for the respective subscription to corresponding to the scope described in the at least one permission indicated in the deployment descriptor.

8. The method of claim 1, wherein the destination is a collection of data values associated with the first subscription, wherein the data structure comprises a Uniform Resource Locator (URL) that points to an authorization server that is a token end point.

9. A system, comprising:
   at least one processor; and
   a non-transitory memory communicatively coupled to the at least one processor, the memory storing instructions which, when executed by the at least one processor, cause the at least one processor to perform operations comprising:
      receiving an indication of a deployment of an application to a distributed computing environment;
      parsing a deployment descriptor associated with the application to determine at least one permission indicated in the deployment descriptor, wherein each permission in the deployment descriptor indicates: i) a service that is provided on the distributed computing environment and that is to be accessible by the application, and ii) a scope of access by the application to the respective service;
      identifying one or more subscriptions to the application on a platform; for each respective subscription of the one or more subscriptions, providing one or more credentials for the respective subscription that correspond to the at least one permission indicated in the deployment descriptor;
      providing an authorization client for each respective subscription of the one or more subscriptions, wherein the authorization client stores the at least one permission;
      storing a first credential of the one or more credentials in a destination, wherein the first credential is associated with a first subscription of the one or more subscriptions;
      accessing the destination to obtain an access token based on the first credential, the access token including at least one scope that is assigned to modify a first configuration in a context of the first subscription that is being used to access the application; and
      modifying the first configuration based on the at least one scope included in the access token.

10. The system of claim 9, wherein the application and the deployment descriptor are included in a deployment package through which the application is deployed to the distributed computing environment.

11. The system of claim 9, wherein the authorization client is arranged according to a version of the Open Authorization (OAuth) standard.

12. The system of claim 9, the operations further comprising:
   providing the destination that points to an authorization server that is a token end point to issue access tokens with populated credentials.

13. The system of claim 9, wherein the service that is provided on the distributed computing environment is an application programming interface (API).

14. The system of claim 9, wherein providing the one or more credentials for the respective subscription includes creating one or more credentials for the respective subscription, and assigning at least one scope to the one or more credentials that corresponds to the scope described in the at least one permission indicated in the deployment descriptor.

15. The system of claim 9, wherein providing the one or more credentials for the respective subscription includes updating one or more existing credentials for the respective subscription to corresponding to the scope described in the at least one permission indicated in the deployment descriptor.

16. One or more non-transitory, computer-readable media storing instructions which, when executed by at least one processor, cause the at least one processor to perform operations comprising:
   receiving an indication of a deployment of an application to a distributed computing environment;
   parsing a deployment descriptor associated with the application to determine at least one permission indicated in the deployment descriptor, wherein each permission in the deployment descriptor indicates: i) a service that is provided on the distributed computing environment and that is to be accessible by the application, and ii) a scope of access by the application to the respective service;
   identifying one or more subscriptions to the application on a platform;
   for each respective subscription of the one or more subscriptions, providing one or more credentials for the respective subscription that correspond to the at least one permission indicated in the deployment descriptor;
   providing an authorization client for each respective subscription of the one or more subscriptions, wherein the authorization client stores the at least one permission;
   storing a first credential of the one or more credentials in a destination, wherein the first credential is associated with a first subscription of the one or more subscriptions;
   accessing the destination to obtain an access token based on the first credential, the access token including at least one scope that is assigned to modify a first configuration in a context of the first subscription that is being used to access the application; and
   modifying the first configuration based on the at least one scope included in the access token.

17. The one or more non-transitory, computer-readable media of claim 16, wherein the application and the deployment descriptor are included in a deployment package through which the application is deployed to the distributed computing environment.

18. The one or more non-transitory, computer-readable media of claim 16, wherein the authorization client is arranged according to a version of the Open Authorization (OAuth) standard.

19. The one or more non-transitory, computer-readable media of claim 16, the operations further comprising:
   providing the destination that points to an authorization server that is a token end point to issue access tokens with populated credentials.

* * * * *